United States Patent
Störig et al.

(10) Patent No.: US 7,941,238 B2
(45) Date of Patent: May 10, 2011

(54) METHOD AND DEVICE FOR OPERATING A MACHINE

(75) Inventors: Wolfgang Störig, Köln (DE); Elmar Sella, Weilerswist (DE)

(73) Assignee: Packtron GmbH, Weilerswist (DE)

( * ) Notice: Subject to any disclaimer, the term of this patent is extended or adjusted under 35 U.S.C. 154(b) by 224 days.

(21) Appl. No.: 12/167,406

(22) Filed: Jul. 3, 2008

(65) Prior Publication Data

US 2008/0307754 A1     Dec. 18, 2008

Related U.S. Application Data

(63) Continuation of application No. PCT/EP2007/000377, filed on Jan. 17, 2007.

(30) Foreign Application Priority Data

Jan. 18, 2006 (DE) .................. 10 2006 002 570
Feb. 15, 2006 (DE) .................. 10 2006 007 230

(51) Int. Cl.
*G06F 19/00* (2006.01)
*G08B 1/08* (2006.01)
*B65B 11/00* (2006.01)
*B07B 13/00* (2006.01)
*G01G 7/00* (2006.01)

(52) U.S. Cl. .............. 700/117; 340/539.13; 340/539.16; 53/461; 29/403.3; 702/173

(58) Field of Classification Search ............. 340/539.13, 340/539.16; 700/117; 53/461; 29/403.3; 702/173

See application file for complete search history.

(56) References Cited

U.S. PATENT DOCUMENTS

| | | | |
|---|---|---|---|
| 7,336,167 B2 * | 2/2008 | Olsen et al. | 340/539.1 |
| 7,337,980 B2 * | 3/2008 | Schaedel | 235/494 |
| 2003/0019922 A1 | 1/2003 | Kuo et al. | |
| 2006/0131405 A1 * | 6/2006 | Schneider | 235/385 |
| 2007/0194019 A1 * | 8/2007 | Seagle et al. | 220/4.08 |

FOREIGN PATENT DOCUMENTS

| | | |
|---|---|---|
| DE | 4131881 A1 | 7/1992 |
| DE | 10145413 A1 | 6/2005 |
| EP | 1 164 101 A2 | 12/2001 |
| EP | 1 266 830 A1 | 12/2002 |
| EP | 1266830 A1 | 12/2002 |
| EP | 1380506 A2 | 1/2004 |
| EP | 1471008 A1 | 10/2004 |
| EP | 1538084 A1 | 6/2005 |
| EP | 1555208 A1 | 7/2005 |
| JP | 2004155469 A | 6/2004 |
| WO | WO 02/028719 A1 | 4/2002 |
| WO | WO 2005/098558 A1 | 10/2005 |

* cited by examiner

*Primary Examiner* — Albert Decady
*Assistant Examiner* — Thomas Stevens
(74) *Attorney, Agent, or Firm* — BainwoodHuang

(57) ABSTRACT

A machine consumes a consumable material during operation, which consumable material can be provided in material units, wherein the machine can be operated in at least one first operating mode, in which the consumable material is consumed. A material unit comprises an identification unit with at least identification data, wherein the identification data is read and is checked to determine whether the identification data can be associated with a predeterminable release data set. The machine is operated in a first operating mode when the identification data can be associated with the release data set.

21 Claims, 3 Drawing Sheets

METHOD AND DEVICE FOR OPERATING A MACHINE

CROSS REFERENCE TO RELATED APPLICATIONS

This patent application is a Continuation of International Patent Application No. PCT/EP2007/000377 filed on Jan. 17, 2007, entitled, "METHOD AND DEVICE FOR OPERATING A MACHINE", the contents and teachings of which are hereby incorporated by reference in their entirety.

FIELD OF THE INVENTION

Various embodiments of the invention are directed to a method and a device for operating a machine, as well as a corresponding packaging machine and a corresponding consumable means unit. In particular, certain embodiments relate to machines which consume a consumable material during operating which consumable material can be provided in consumable means units. A particular field of application is use for so-called stretch machines, by means of which packaging units to be packaged can be wrapped with a film.

BACKGROUND

A so-called stretch machine is a machine by means of which a multiplicity of items to be packed can preferably be wrapped with a film, possibly with the film being stretched. The most familiar example is pallet wrapping stretching, in which a pallet which, for example, is stacked with boxes, is wrapped in a stretchable film. The assembly formed in this way comprising the pallet and boxes can be transported relatively easily and safely, without boxes being able to fall out. The wrapping process can be carried out either by manual wrapping stretch machines or else by semi-automatic or fully-automatic wrapping stretch machines. The stretch machine uses so-called stretch film, which can be stretched.

Not only in the case of stretch machines such as these but also in the case of other machines which consume a consumable material during operation, such as the film in the case of a stretch machine, it is often necessary, in particular in order to ensure the quality and to guarantee a defined result, to operate these machines with a specific type or quality of consumable materials. By way of example, there are a multiplicity of different films which can be used with one stretch machine, although only specific types of film can be used, depending on the application, in order to ensure an optimum stretching process result.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

Figure 1:
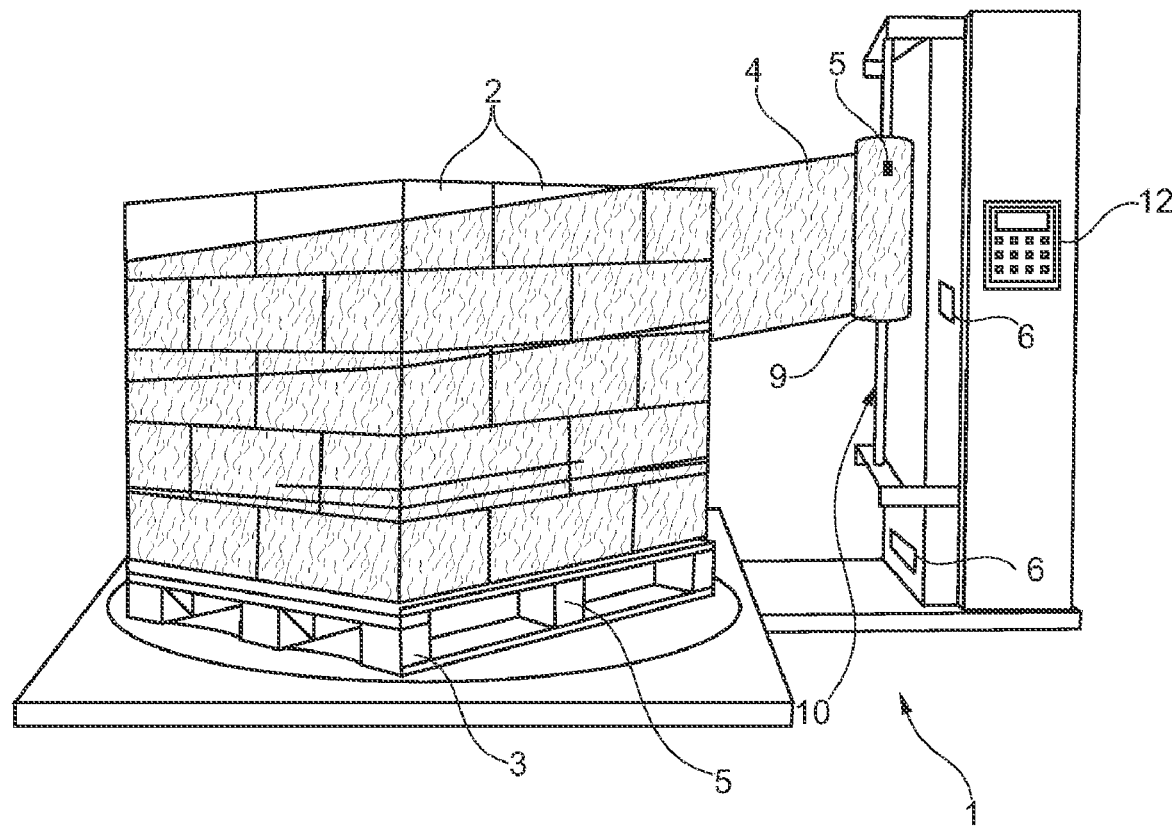
FIG. 1 shows a pallet wrapping stretch machine.

Embodiments of the invention are based on the object of proposing a method and a device for operating a machine which consumes a consumable material, in which an operation result can be achieved with a predeterminable quality which is not interfered with by incorrect use of an incorrect consumable material.

The method for operating a machine which consumes a consumable material during operation, which consumable material can be provided in consumable means units, wherein the machine can be operated in at least one first operating mode, in which the consumable material is consumed, is distinguished in that a consumable means unit comprises an identification unit with at least identification data, wherein the identification data is read and is checked to determine whether the identification data can be associated with a predeterminable release data set. The machine is operated in a first operating mode when the identification data can be associated with the release data set.

The method advantageously allows the machine to be released only when the consumable material satisfies specific characteristics. In this case, in particular, the expression release of the machine means correct operation of the machine. When the machine is a stretch machine, this means a stretching process, for example for wrapping a loaded pallet with film. The check as to whether the identification data can be associated with a predeterminable release data set should be understood in particular as meaning that the identification data is compared with one or more predetermined or predeterminable data records which form the release data set and, in the event of a match, the machine is switched to the first operating mode. Another option is for the identification data to represent a code which can be decrypted using a specific method. In this case, by way of example, association with a release data set means decryption of the code, and its verification.

It is therefore possible, for example, in the case of a stretch machine, to ensure that only specific film qualities are permissible for specific stretching processes, for example, complex geometries of the item to be packed that is to be wrapped. Further options for a machine which consumes a consumable material during operation are machines by means of which items to be packaged are wrapped with shrink film or else applications from the foodstuffs field, for example, in the case of coffee machines or the like.

A method is therefore particularly preferred for operating a packaging machine for packing at least one item to be packaged, in which the packaging machine can be operated in at least one operating mode in which the item to be packed is packaged, wherein the packaging may comprise at least one of the following processes:

a) movement of the item to be packed into a package, and
b) wrapping the item to be packed with a packaging material, wherein at least one of the following materials comprises an identification unit with identification data:

A) the packing and
B) the packaging material.

In this case, the identification data is read, and a check carried out to determine whether the identification data can be associated with a release data set, with the packaging machine being operated in a first operating mode when the identification data can be associated with the release data set.

In this case, packaging material means, in particular, film, particularly preferably stretch film. Furthermore, a packaging material can also particularly advantageously be understood to mean a plastic strip and/or metal strip by means of which, for example, a pallet load is secured by wrapping it. Furthermore, the expression packaging material also covers, for example, pallets on which goods are stacked. In particular, packaging should be understood as meaning boxed packages or the like. This means that, in the case of a method such as this, the identification unit may be located at, on or in a film or else alternatively or cumulatively in the corresponding pallet or the box.

In general, the identification data may be an identification of the product as such, for example, in the form of a serial number, a manufacturer's identification and/or quality information as well.

The method and the device can also, in addition to the advantages already described, be used advantageously in order to implement a business idea in which a stretch machine, a wrapping machine or some other machine which consumes a consumable material is made available to a customer, and the costs of this loan process are not recovered by a loan fee for the machine but in fact by the costs of the consumable materials, for example, the stretch films. For example, it is therefore feasible for a lender to initially make a stretch machine available to a customer at no cost, but to contractually require him to buy only from said lender the stretch films to be used. In this case, the method and the device make it possible to ensure that the customer can operate the loaned machine only using consumable materials from the lender. In this case, when the check as to whether the identification data can be associated with the release data set gives a negative result, the machine is, for example, inhibited or is not started up.

According to one advantageous refinement of the method, the machine is a packaging machine and the consumable material is packaging material.

In this context, it is particularly preferable for the machine to be a stretch machine by means of which items to be packaged can be wrapped with film, in which case this allows the items to be packaged to be fixed on one another, and possibly with further elements, such as a pallet, in order in this way in particular to simplify the dispatch, the transport or the storage of these packaged items in an advantageous manner, and to make these processes safer. In this case, consumable material means, in particular, film such as stretch film.

According to one further advantageous refinement of the method, the machine is switched to a second operating mode, in which operation of the machine is impossible, when the identification data cannot be associated with the release data set.

For example, this makes it possible to ensure that only consumable materials of a specific quality are used, in order in this way to ensure the quality of the result of operation of the machine.

According to a further advantageous refinement of the method, when the identification data cannot be associated with the release data set, the machine is switched to the first operating mode, and a non-release registration process is carried out.

This makes it possible, for example, when the identification data cannot be associated with the release data set, that is to say when no release can be granted, for the machine, for example, to be ready to operate to a restricted extent and/or for a warning to be emitted to the user. It is also possible for the non-release registration process to comprise not only a warning to the user but also storage of data relating to the entry to the first operating mode despite non-release, incrementing a counter in order to count the operations in the first operating mode despite non-release, and/or signaling of the entry to the first operating mode despite non-release.

Signaling of entry to the first operating mode despite non-release may mean a message to the user and/or for example to the manufacturer and/or seller and/or lender of the machine.

An electronic counter can preferably be provided which counts how often the machine has been operated despite non-release, and/or how many consumable means units can be consumed without release. Signaling of the entry to the first operating mode despite non-release may comprise not only a visual and/or audible warning to the user but, for example, also production of a link to third parties by means of telecommunications facilities. These may be done, for example, by transmitting an SMS to the seller, operator and/or lender of the machine or else via an e-mail to them.

According to a further advantageous refinement of the method, the identification unit comprises a data memory which can be read. At least the identification data can be stored in the data memory. In this context, it is particularly preferable for the identification unit to comprise at least one of the following units:

a) a data store which can be read optically;
b) a data store which can be read electromagnetically; and
c) a data store which can be read mechanically.

In this case, in particular, a data store which can be read optically should be understood as meaning a marking at, in and/or on the consumable material. In the case of a stretch film which is wound on to a sleeve, this may, for example, be at least one so-called barcode on the sleeve and/or on the film or else a multiplicity of barcodes on the film itself. In the latter case, the stretch machine would operate only when a barcode which has been applied to or has been introduced into the film can be read at regular intervals during operation.

A data store which can be read electromagnetically should be understood as meaning, in particular, a so-called RFID (Radio Frequency Identification Device) and/or a transponder. Components such as these comprise not only a data store but in particular an antenna by means of which data can be written to the data memory or read from it, and can be transferred to appropriate readers. This communication normally takes place by means of electromagnetic radiation in the RF range (radio-frequency range), for example at frequencies of about 125 kHz (kilohertz). In this case, both active and passive transponders or RFIDs may be provided, that is to say those which draw their energy from a separate electrical source such as a battery, or which are supplied with the energy required for operation via the RF radiation.

Furthermore, this may also be a data memory which can be read mechanically. A data memory such as this should be understood as meaning, in particular, a particular embodiment of the packaging units. For example, the sleeve of a stretch film roll can be designed such that an appropriate gripper must engage with it as a read unit in order to allow operation of the machine.

Data memories which can be read electromagnetically, in particular RFIDs and/or transponders, are preferable in this case, since they have the advantage that they can be read without making contact and without the need for visual access. For example, it is advantageously possible in this case to fit the transponder in the interior of the sleeve on to which a stretch film roll is wound, and for this then to be read through the film. This particularly advantageous embodiment makes it possible to prevent incorrect actions and undesirable starting up of the machine.

In one particularly preferable control process, the identification data is read without making contact. In this case, it is particularly preferable for barcodes to be read optically or for RFIDs or transponders to be read electromagnetically.

According to a further advantageous refinement of the method, the identification data comprises at least one of the following information items:

a) data relating to the seller of the consumable means unit;
b) data relating to existing licensing agreements between the seller and the purchaser;
c) data relating to the purchaser of the consumable means unit;
d) data for customizing the respective consumable means unit; and
e) data relating to the quality of the consumable means unit.

Therefore, in particular, the identification data comprises an identification of the seller of the consumable means unit. In particular, this makes it possible to operate the machine only when the consumable means unit originates from a specific manufacturer or seller. Furthermore, the identification data may comprise data from which it is possible to read whether the purchaser has concluded a license agreement with the seller. The machine can therefore be operated using the method only when such a licensing agreement exists. This also applies to data relating to the purchaser of the consumable means unit. Furthermore, the identification data may also comprise data for customization of the consumable means unit, for example, a serial number and/or part number. The identification data may comprise data relating to the quality of the consumable means unit. For example, in the case of a stretch film, this could comprise the thickness of the stretch film, for example, 15 μm (micrometers), 20 μm or 25 μm and possibly also the visual characteristics of this film in the identification data. It is then, for example, possible to ensure that, for example, if the user indicates that the goods to be packaged are light-sensitive, that only opaque or reflective film is used. Alternatively, for example, it is possible for items that are relatively difficult to package, and which, by way of example, have a multiplicity of corners and edges, recesses and/or projections, to specify a specific film quality in order in this way to prevent uncontrolled tearing of the film or the formation of undesirable material stresses.

According to a further aspect, a device is proposed for operating a machine which device consumes a consumable material during operation which consumable material can be provided in consumable means units. The device comprises means for reading identification data from an identification unit which can be fitted to, on or in a consumable means unit. According certain aspects, control means are provided, are connected to the means for reading identification data, and check whether the identification data can be associated with a predeterminable release data set. The machine is switched to a first operating mode by the device when the identification data can be associated with a predeterminable release data set.

The device is particularly suitable for carrying out the method. The control means may, in particular, be included within a machine control system and in particular this may also be in the form of a program product which can be run on a computer.

In one particularly preferable embodiment of the device, the means for reading identification data emit and/or receive electromagnetic radiation.

This should be understood as meaning, in particular, a barcode reader which emits electromagnetic radiation in the visible wavelength range, and detects the reflected electromagnetic radiation. This should also be understood as covering a device in which a transponder or RFID is read. This is done by radiation of electromagnetic radiation in the RF range, resulting in either energy being transmitted to a transponder on the consumable means unit, and simultaneous activation with the transponder being read or purely reading the transponder in the case of an active transponder. This transponder then transmits the identification data to the means for reading identification data. This identification data is then transmitted to the control means where it is evaluated. During the evaluation process, a check is carried out to determine whether the identification data can be associated with a predeterminable release data set. In this case, the release data set means a set of data records all of which allow release of the machine. If the data record of the identification unit is present in the release data set or it is possible, for example, to carry out a mathematical operation on the identification data to obtain information on the basis of which a desired release can take place, and identification data can thus be associated with the release data set, then the machine is switched to the first operating mode.

In another advantageous embodiment, the means for reading identification data interact mechanically with the identification unit. This can be achieved in particular by a specific embodiment of the consumable means units, which interact with corresponding means on the machine or the corresponding device and thus allow release. By way of example, this may be a cutout in the consumable means unit, with which a corresponding gripping arm can interact.

In a further advantageous refinement of the device, the means for reading identification data operate without making contact.

This is the case, in particular with the identification data being read from identification units such as transponders or RFIDs. Furthermore, these have the advantage that an RFID need not be in visual contact with the means for reading identification data. An RFID can therefore be provided even at inaccessible points, for example, in the interior of the consumable means unit, in order to make manipulation harder in this way.

Furthermore, a packaging machine is proposed which is operated using the method or which has a device. In this case, a packaging machine is preferable in the form of a machine for wrapping items to be packaged in film. Machines such as these are referred to, for example, as stretch machines.

Furthermore, a consumable means unit is proposed which comprises at least one identification unit and can be used in accordance with the method and/or with a device and/or with a packaging machine.

By way of example, a consumable means unit such as this comprises film, in particular stretch film which is wound on to a corresponding sleeve body or the like.

According to one preferred refinement of the film, this refinement comprises a sleeve as a winding core, on to which the film is wound. This winding core and/or the film have/has a transponder as the identification unit.

Alternatively or additionally, the film may comprise an identification unit which, for example, is fitted periodically and based on optical identification. For example, a sleeve of the stretch film may particularly advantageously comprise a transponder as the first identification unit, and in addition the film itself may have, for example, a barcode at regular intervals.

The details and advantages disclosed for the method can also be used for and transferred to the device, to the consumable means unit, to the packaging machine and to the film and may in each case be reversed.

DESCRIPTION OF EXAMPLE EMBODIMENTS

FIG. 1 shows a first exemplary embodiment for a stretch machine 1, specifically a pallet wrapping stretch machine. In this machine, items 2 to be packed are located on a pallet 3. These items 2 to be packed are wrapped with a film 4 by the stretch machine 1 by using a rotation means 8 (or rotation apparatus 8) to rotate the pallet 3 while a film roll 9 on a stand 10 is moved up and down. The film 4 is stretched while the pallet 3 and the items 2 to be packed are being wrapped.

The stretch machine 1 is operated using the method. For this purpose, the film has an identification unit 5, which is indicated only schematically. The identification unit 5 comprises, in particular, a so-called RFID or a transponder, provided at, on or in a sleeve which is not shown, and on to which the film 4 is wound. The stretch machine 1 has means 6 for reading identification data (or reading apparatus 6). If the identification unit 5 is a transponder, then appropriate readers may be provided as the means 6 for reading identification data, and can communicate with the identification unit 5 by electromagnetic radiation preferably in the RF range (radio-frequency range). Alternatively or additionally, the pallet 3 may also have an identification unit 5, which can likewise be read, preferably without contact being made, by appropriate means 6 for reading identification data.

Using the method, the stretch machine 1 is switched to a first operating mode, or is operated in this mode, by the items 2 to be packed and/or the pallet 3 being wrapped, when the identification data which is read from the identification unit 5 can be associated with a predeterminable release data set. For example, it is possible to predetermine a set with one or more data records as the release data set for the stretch machine 1, whose reading causes the stretch machine 1 to be operated. In particular, this allows a multiplicity of data records to be stored or allows the identification data in the identification unit 5 to be coded by means of a specific mathematical method. For example, this allows function values to be stored as identification data in the identification unit 5, which data, on insertion into a specific mathematical function, produces or does not produce a release code, thus allowing association of the identification data with the release data set. The identification data is checked and is associated with a release data set by control means 12 (or control apparatus) which in this case are part of a machine control system.

If the identification data cannot be associated with a release data set, then there are various options. For example, it is possible to stop the stretch machine 1 until a film 4 is used which contains an identification unit with appropriate identification data. If a film 4 without an identification unit 5 is used, then this leads to the identification data being identified as data which cannot be associated with a release data set, and in this case, as well, it is then not possible to start up the stretch machine 1.

Alternatively, it is possible to operate the stretch machine nevertheless, and at the same time to carry out a non-release registration process. By way of example, this non-release registration process may comprise information to the user of the stretch machine 1 that a non-contractual packaging material is being used. A further option is to make the lender and/or owner of the installation aware of the fact that the machine is being operated with non-contractual film. This can be done, for example, by conventional communication channels, for example, by sending an SMS or an e-mail if the stretch machine 1 has appropriate communication facilities. Alternatively or additionally it is also possible to use a counter which counts the number of films such as these which are not contractual. This counter can then be read by the lender or owner during a maintenance process. This all makes it possible for the lender to initiate sanction measures against the user of the device, if appropriate, at a later time.

Figure 2:
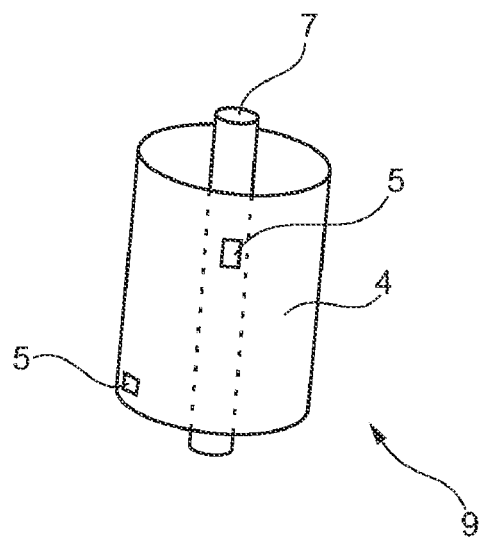
FIG. 2 shows a consumable material unit.

FIG. 2 shows a consumable means unit, specifically a film roll 9 comprising a film 4 wound on a sleeve 7. The sleeve 7 has an RFID in its interior as the identification unit 5. Alternatively or additionally, the film itself, for example, may comprise further identification units, in particular appropriate barcodes, at periodic intervals.

Figure 3:
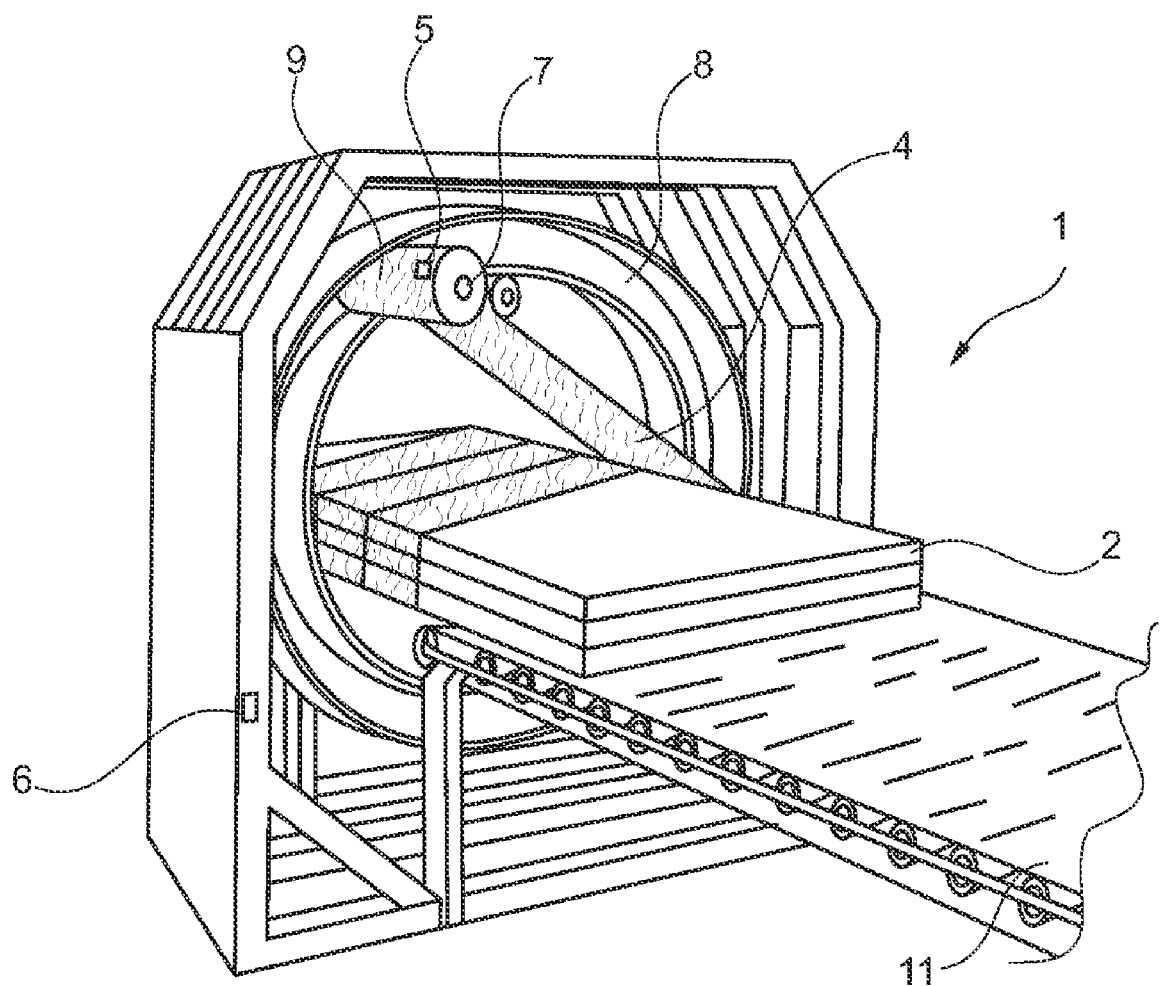
FIG. 3 shows a horizontal wrapping stretch machine.

FIG. 3 shows a further example of a stretch machine 1 operated. This is a so-called horizontal wrapper in which at least one item 2 to be packaged, normally a relatively bulky item 2 to be packaged such as a carpet or large-format building slabs, is or are wrapped with a film 4. In this case, the film 4 is wound on to a sleeve 7 and therefore forms a film roll 9 which has an identification unit 5. The stretch machine 1 has means 6 for reading identification data on the identification unit 5. This reading process is carried out without making contact, for example, by means of electromagnetic radiation using an RFID as the identification unit 5. In this stretch machine 1, the rotation means 8 move the film roll 9 around the item 2 to be packaged, and the latter can be moved by appropriate feed means 11 (or feed apparatus).

Figure 4:
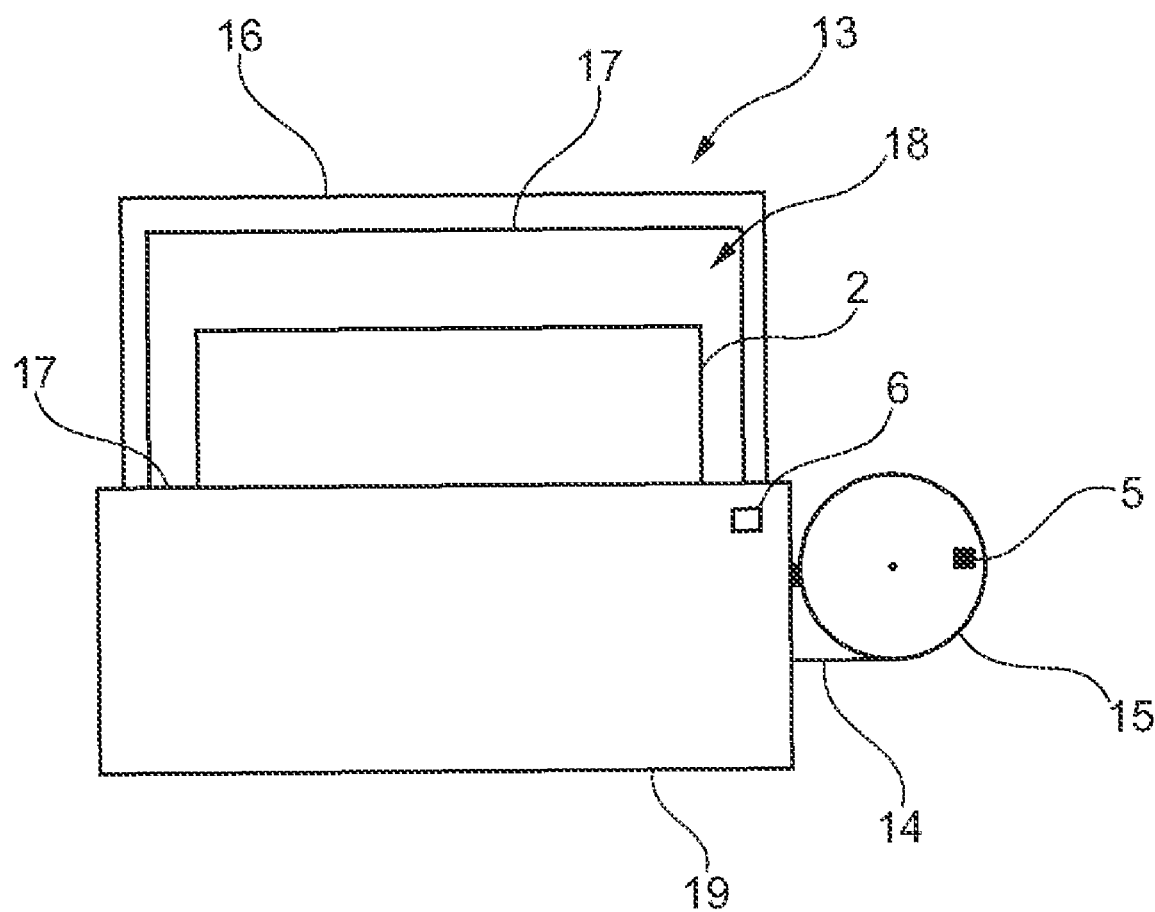
FIG. 4 shows a frame wrapping machine.

FIG. 4 shows an example of a wrapping (or banding) machine 13 operated. This is a so-called frame wrapping machine 13 in which at least one item 2 to be packaged is wrapped with a strip 14, normally a plastic strip and/or metal strip. The strip 14 is stored on a strip roll 15 which has an identification unit 5. The wrapping machine 13 has means 6 for reading identification data on the identification unit 5. The reading process is carried out without making contact, for example, by means of electromagnetic radiation using at least one RFID as the identification unit 5. In a frame wrapping machine 13 the strip 14 is passed through a strip guide channel 17 which is formed in the frame 16 and in the drive unit 19, so that the area 18 bounded by the frame 16 is first of all surrounded by the strip 14. In this case, the strip 14 is guided through the strip guide channel 17 for example by means of drive wheels (which are not shown) which are formed in the drive unit 19 and drive the strip 14 by transmission of power. When the strip 14 is now fed to the strip guide channel 17, then the item 2 to be packaged can be wrapped in the area 18 by drawing the strip 14 tight. For this purpose, the strip guide channel 17 is advantageously provided on the inside with spring-operated closures which open when the strip 14 is drawn tight, releasing the strip 14. Once the strip 14 is resting on the item 2 to be packaged and/or once a previously defined stress has been applied to the strip 14, the strip 14 is connected to itself, for example by welding and/or adhesive bonding, and is then cut off such that the item 2 to be packaged remains wrapped via the closed strip 14.

The wrapping machine 13 is switched to the first operating mode when the identification unit stored on the identification unit 5 can be associated with a release data set. In particular, the method is controlled such that the wrapping machine 13 can be operated only with correspondingly identified strips 14 and/or strip rolls 15. Alternatively, or additionally, the identification unit 5 may also be formed directly on the strip 14, in particular at periodic intervals. In addition to a frame wrapping machine, all other conventional wrapping machines can also be operated advantageously.

The method and the device advantageously allow the control of machines which during operation consume a consumable material, which is in the form of a consumable material unit, in which case the consumption as a function of the identification data stored on the identification unit 5 can take place. In particular, this makes it possible to ensure a quality level during operation of the machine, preventing incorrect actions by the use of a wrong consumable material. Another field of use is, in the case of machines such as stretch machines, being able to ensure that these machines can be operated only with consumable materials such as stretch film from one specific provider.

While various embodiments of the invention have been particularly shown and described, it will be understood by those skilled in the art that various changes in form and details may be made therein without departing from the spirit and scope of the invention as defined by the appended claims.

What is claimed is:

1. A method for operating a machine, which consumes a consumable material during operation, which consumable material can be provided in consumable means units,
   wherein the machine can be operated in at least one first operating mode, in which the consumable material is consumed,
   wherein a consumable means unit comprises an identification unit with at least identification data,
   wherein the identification data is read and is checked to determine whether the identification data can be associated with a predeterminable release data set,
   wherein the machine is operated in a first operating mode when the identification data can be associated with the predeterminable release data set, and
   wherein the machine is switched to a second operating mode, in which operation is not possible, when the identification data cannot be associated with the predeterminable release data set.

2. The method as claimed in claim 1, wherein the machine is a packaging machine, and the consumable material is packaging material.

3. The method as claimed in claim 1, in which, when the identification data cannot be associated with the release data set, the machine is constructed and arranged to carry out a non-release registration process.

4. The method as claimed in claim 3, in which the non-release registration process comprises at least one of the following processes:
   a) storage of data relating to an entry into an particular operating mode despite non-release;
   b) incrementation of a counter in order to count the operation in the particular operating mode despite non-release, and
   c) signaling of the entry into the particular operating mode despite non-release.

5. The method as claimed in claim 1, in which the identification unit comprises a readable data store.

6. The method as claimed in claim 5, in which the identification unit comprises at least one of the following units:
   a) a data store which can be read optically;
   b) a data store which can be read electromagnetically; and
   c) a data store which can be read mechanically.

7. The method as claimed in claim 1, in which the identification data is read without making contact.

8. The method as claimed in claim 7, in which the identification unit comprises at least one transponder.

9. The method as claimed in claim 1, in which the identification data comprises at least one of the following information items:
   a) data relating to a seller of the consumable means unit;
   b) data relating to existing licensing agreements between the seller and a purchaser;
   c) data relating to the purchaser of the consumable means unit;
   d) data for customizing a respective consumable means unit; and
   e) data relating to the quality of the consumable means unit.

10. A device for operating a machine which consumes a consumable material during operation, which consumable material can be provided in consumable means units, comprising means for reading identification data from an identification unit which can be fitted to, on or in a consumable means unit,
    wherein control means are provided, are connected to the means for reading identification data and check whether the identification data can be associated with a predeterminable release data set, and which switch the machine to (i) a first operating mode, in which the consumable material is consumed, when the identification data can be associated with the predeterminable release data set, and (ii) a second operating mode, in which operation is not possible, when the identification data cannot be associated with the predeterminable release data set.

11. The device as claimed in claim 10, in which the means for reading identification data emit and/or receive electromagnetic radiation.

12. The device as claimed in claim 10, in which the means for reading identification data interact mechanically with the identification unit.

13. The device as claimed in claim 10, in which means for reading identification data operate without making contact.

14. A packaging machine, comprising:
    a device which consumes a consumable material during operation, which consumable material can be provided in consumable means units, including means for reading identification data from an identification unit which can be fitted to, on or in a consumable means unit,
    wherein control means are provided, are connected to the means for reading identification data and check whether the identification data can be associated with a predeterminable release data set, and which switch the packaging machine to (i) a first operating mode, in which the consumable material is consumed, when the identification data can be associated with the predeterminable release data set, and (ii) a second operating mode, in which operation is not possible, when the identification data cannot be associated with the predeterminable release data set.

15. The packaging machine as claimed in claim 14, which is a machine for wrapping items to be packaged in film.

16. The packaging machine as claimed in claim 14, which is a banding machine for banding items to be packaged with strip.

17. A consumable means unit, comprising:
    a consumable material; and
    at least one identification unit fitted to, on or in the consumable material, each identification unit being arranged to be (i) read by means for reading identification data and (ii) checked by control means whether the identification data can be associated with a predeterminable release data set thus causing a machine to switch to (i) a first operating mode, in which the consumable material is consumed, when the identification data can be associated with the predeterminable release data set, and (ii) a second operating mode, in which operation is not possible, when the identification data cannot be associated with the predeterminable release data set.

18. The consumable means unit as claimed in claim 17 wherein the consumable material is formed by one of a film and a strip.

19. The consumable means unit as claimed in claim 18, comprising a sleeve as a winding core, which comprises a transponder as the identification unit.

20. The consumable means unit as claimed in claim 18, comprising a transponder as the identification unit.

21. The consumable means unit as claimed in claim 18, in which identification units are applied periodically and are based on optical identification.

* * * * *